United States Patent [19]

Mudford

[11] Patent Number: 4,909,093

[45] Date of Patent: Mar. 20, 1990

[54] CLOSURE ELEMENT TRANSLATION MECHANISMS

[75] Inventor: David A. J. Mudford, Auckland, New Zealand

[73] Assignee: Arcware Doors and Automatics Limited, Auckland, New Zealand

[21] Appl. No.: 201,652

[22] Filed: Jun. 1, 1988

[30] Foreign Application Priority Data

Jun. 2, 1987 [NZ] New Zealand ........................ 220515

[51] Int. Cl.[4] ........................ F16H 13/02; E05D 15/06

[52] U.S. Cl. ........................................ 74/209; 49/409; 384/54

[58] Field of Search .................... 49/360, 409; 74/202, 74/209; 384/54, 58

[56] References Cited

U.S. PATENT DOCUMENTS

| | | | |
|---|---|---|---|
| 2,637,550 | 5/1953 | Ritter | 268/59 |
| 2,843,375 | 7/1958 | Lesage | 268/53 |
| 3,043,584 | 7/1962 | Kielhorn | 268/53 |
| 3,425,162 | 2/1969 | Halpern | 49/409 X |
| 3,455,058 | 7/1969 | Hewitt | 49/360 |
| 3,527,112 | 9/1970 | Korell | 74/209 X |
| 3,584,414 | 6/1971 | Bahnsen | 49/272 |
| 3,683,710 | 8/1972 | MacFarland | 74/89.21 |
| 3,719,005 | 3/1973 | Carli | 49/28 |
| 3,925,933 | 12/1975 | Reuter | 49/409 |
| 4,188,552 | 2/1980 | Brimer | 310/13 |
| 4,317,382 | 3/1982 | Riser | 74/25 |
| 4,378,709 | 4/1983 | Chitayat | 74/202 X |
| 4,503,637 | 3/1985 | Parente | 49/360 X |
| 4,539,854 | 9/1985 | Bradshaw et al. | 74/202 X |

FOREIGN PATENT DOCUMENTS

| | | | |
|---|---|---|---|
| 2841010 | 4/1980 | Fed. Rep. of Germany | 74/202 |

*Primary Examiner*—Leslie A. Braun
*Assistant Examiner*—Janice E. Chartoff
*Attorney, Agent, or Firm*—Ladas & Parry

[57] ABSTRACT

This invention relates to a friction drive mechanism for a motorized sliding door. The door is suspended by a first rail and its movement guided by a third rail. A second rail is flexibly coupled to the first and biased against a motorized driving roller by a simple tensioning mechanism. The tensioning mechanism maintains the friction contact between the driving roller and the second rail. The flexible coupling joining the first and second rails compensates for any misalignment in the mounting of the componentry. The flexible mounting also allows for the door to be driven around curves.

17 Claims, 2 Drawing Sheets

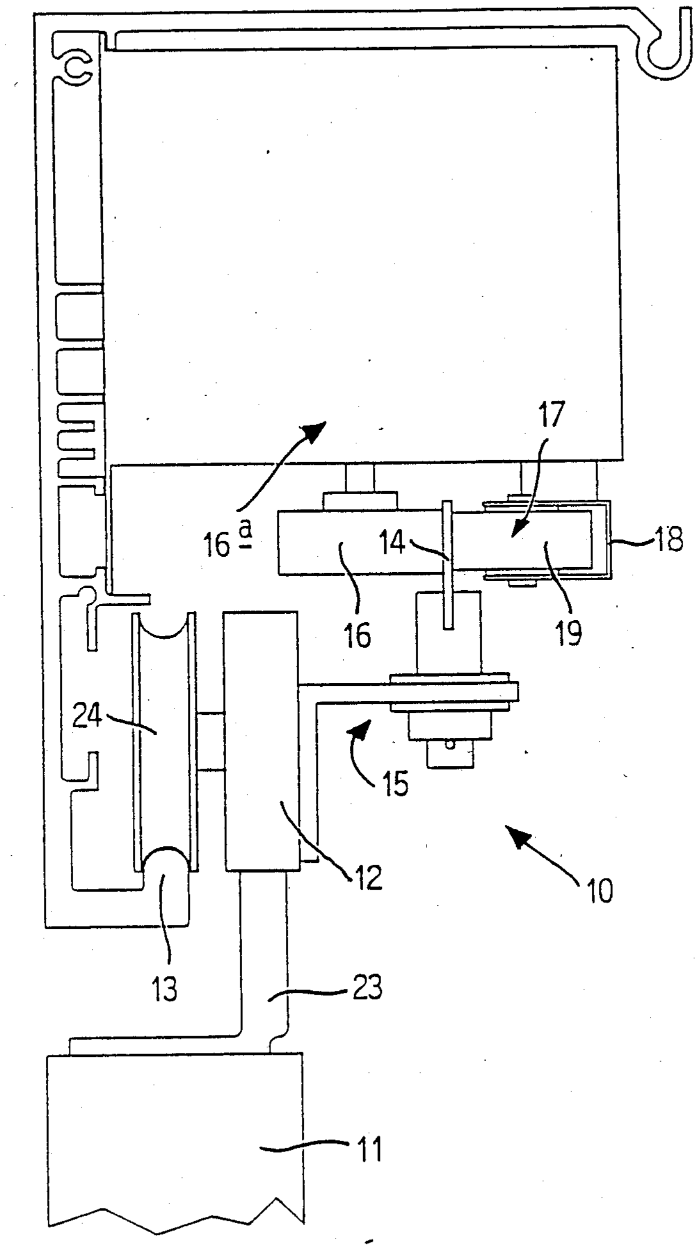
FIGURE ONE

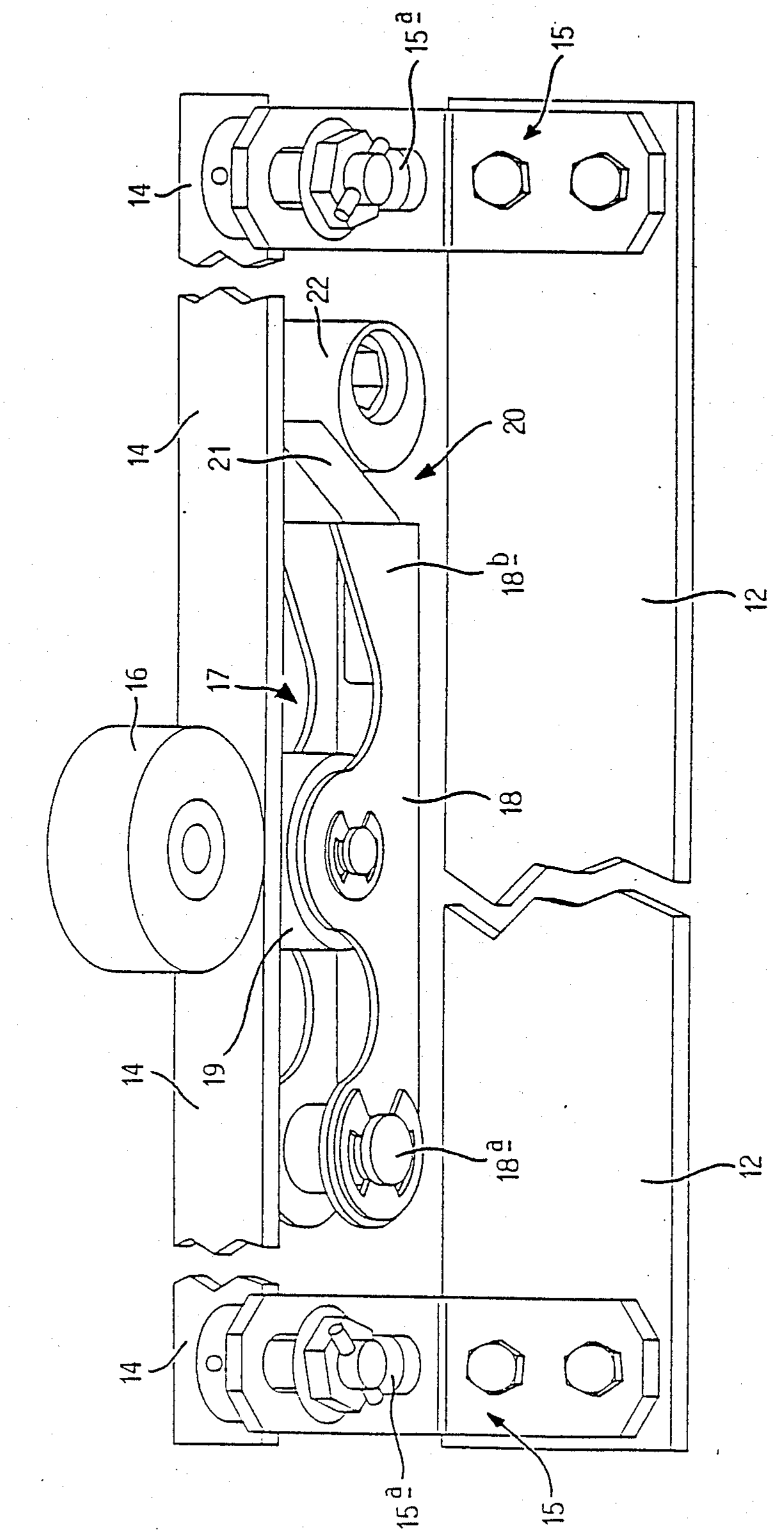
FIGURE TWO

CLOSURE ELEMENT TRANSLATION MECHANISMS

FIELD OF THE INVENTION

This invention relates to a closure element translation mechanism.

An object of this invention is to provide an actuating and drive mechanism for a self-opening door of simple construction.

It is further object of this invention to provide an actuating and drive mechanism capable of translating a closure element in a non-linear path.

SUMMARY OF THE INVENTION

In a first broad aspect of this invention there is provided an closure element translation mechanism comprising an elongate drive rail, an elongate transfer rail, a frictional drive element, and frictional drive presssure maintaining means, and wherein, the elongate drive rail is non-rigidly mounted to the elongate transfer rail, the elongate drive rail is adapted to be disposed intermediate the frictional drive and frictional drive pressure maintaining means, and the frictional drive means are motivated by a prime mover. In a second broad aspect of this invention, there is provided a closure element translation mechanism, as described in the preceding paragraph, further comprising an elongate guide rail, and wherein, the elongate transfer rail further incorporates closure element support means and at least one supporting guide follower, whereby, in use, the supporting guide follower(s) is/are adapted to be locateable within the guide rail.

The foregoing summary, as well as the following description of the presently preferred embodiment of the invention, will be better understood when read in conjunction with the appended drawings, it being understood, however, that this invention is not limited to the precise arrangements illustrated, and that in further describing this invention, reference is made to a preferred form which should be considered in all its novel aspects and which is given by way of example only.

BRIEF DESCRIPTION OF THE DRAWINGS

FIG. ONE is a cross-sectional schematic view of the invention, and

FIG. TWO is a perspective view detailing the drive rail thereof and frictional-drive and associated componentry.

DESCRIPTION OF SPECIFIC EMBODIMENTS

Referring to the drawings, where like numerals indicate like elements in both of the two views, it can be seen that the invention, in one presently preferred embodiment, provides for a closure element translation device 10 consisting in, at least, a closure element 11 (e.g. a door), supported by a transfer rail 12, the path available to the transfer rail 12 being provided by a supporting guide rail 13, the transfer rail 12 being motivated by a friction-driven drive rail 14, attached thereto by non-rigid mountings 15.

The drive rail 14 is disposable within and adapted to be driven by the frictional drive componentry detailed in FIGURE TWO, comprising a frictional drive element 16 formed from resilient material, such as rubber, and frictional drive pressure maintaining means 17. The frictional drive element is cylindrical in shape and coupled to the prime mover 16*a*.

The frictional drive pressure maintaining means comprises a housing 18, articulateable about one end 18a thereof, and incorporates a roller 19. The roller 19 is adapted to impinge the drive rail 14 against the frictional drive element 16 by tensioning means 20. The tension may be effected by utilization of a strip 21 of spring steel and an eccentric adjustment device 22. This construction causes the frictional co-efficient between the drive rail 14 and drive element 16 to remain subsstantially constant when the closure element 11 is being translated.

The drive rail 14 is laterally and complementarily adapted to be disposed intermediate the tensioned roller 19 and drive element 16. It can be formed from a variety of materials, such as aluminium, rubber, or ribbon-type materials. Generally, the drive rail 14 is attached at its distal ends to the transfer rail 14 by non-rigid mountings 15. Generally, the drive rail 14 will have a length commensurate to the width of the closure element-11 and not less than the desired mensurated translation of that element 11. Generally, the mensurated translation will be less than the width of the closure element 11.

The non-rigid mountings 15 can be provided in a large variety of forms. It is desirable the the transfer rail 12 may freely be able to slide closer to or further from the drive rail 14, and so that some degree of pivoting movement between the two is permissable. As best seen in FIG. TWO, the couplings 15 may simply comprise "L" shaped brackets bolted to the transfer rail, and fastened through a slotted aperture 15a to the drive rail.

The lateral movement provided by the slotted apertures 15*a* allows for full bearing of the frictional drive element 16 against the drive rail 14. Thus uninhibited translation of the closure element 11 may be maintained despite deflections in the drive, guide or support elements.

The transfer rail 12 generally has a length commensurate with the width of the closure element 11, and includes closure element support means 23 and at least one guide roller 24.

It is desirable that the mounting of the guide roller(s) 24 be above the closure element 11's centre of mass, so that in use, the closure element 11 is vertically suspended in balance from the guide roller(s) 24. Thus a relatively small electric motor can be used as the prime-mover 16*a* of the devise. Successful utilization of stepping motors have been made in this regard, having nominal torque outputs approximating 2.5 kg cm.

Use has been made of aluminium extrusions to form the elongate guide rail 13, which will generally have a length not less than the sum of the closure element 11's width and mensurated translation. It will usually be affixed to a wall or section thereof, above a closure element opening (doorway) and below the prime mover 16*a*, and may be of a linear or curved configuration.

Means for establishing the position of the closure element relative to the opening thereof are provided in the form of detectable elements (not shown), such as magnets, on or proximate to each end of the drive rail 14 assembly. Detector elements (not shown) are mounted proximate the guide rail 13. In addition thereto, or as an alternative to the above, the actual rate of travel of the door may be measured incorporating magnets (not shown) in the drive element 16 or tensioned roller 19, and proximately cited "Hall Effect" sensors (not shown).

Information collected by such sensors is communicated to suitable control means for determination as to whether the closure element 11 is in a open or closed position, whether is is being jammed, or needs to be reversed or stopped.

It will be recognised by those skilled in the art, that changes may be made to the above-described embodiment of the invention without departing from the broad invention concept thereof. It will be understood, therefore, that this invention is not limited to the particular embodiment disclosed, but is intended to cover all modifications which are within the spirit of the invention as defined by the appended claims.

I claim:

1. A closure element translation mechanism comprising an elongate drive rail, closure element support means, a frictional drive element, frictional drive pressure maintaining means, and means for nonrigidly mounting the elongate drive rail to the closure element support means to provide a degree of lateral sliding there-between, the elongate drive rail being adapted to be disposed intermediate the frictional drive element and frictional drive pressure maintaining means, and the frictional drive element being motivated by a prime mover.

2. A closure element translation mechanism, as claimed in claim 1, further comprising an elongate guide rail, and wherein the closure element support means incorporates at least one supporting guide follower, whereby, in use, the supporting guide follower(s) is/are adapted to be locateable within the guide rail.

3. A closure element translation mechanism as claimed in claim 1, wherein the prime-mover motivating the frictional drive element is a stepping motor.

4. A closure element translation mechanism as claimed in claim 2, wherein the guide rail is of a non-linear configuration.

5. A sliding door actuator comprising an elongate drive rail, door support means, a frictional drive element, and frictional drive pressure maintaining means, and wherein, the elongate drive rail is non-rigidly mounted to the door support means to provide a degree of lateral sliding therebetween, the elongate drive rail is adapted to be disposed intermediate the frictional drive element and frictional drive pressure maintaining means, and the frictional drive element is motivated by a prime mover.

6. A sliding door actuator, as claimed in claim 5, further comprising an elongate guide rail, and wherein the door support means incorporates at least one supporting guide follower, whereby, in use, the supporting guide follower(s) is/are adapted to be locateable within the guide rail.

7. A sliding door actuator as claimed in claim 6, wherein the guide rail is of a non-linear configuration.

8. A sliding door actuator as claimed in claim 5, wherein the prime-mover motivating the frictional drive element is a stepping motor.

9. A closure element translation mechanism comprising an elongate drive rail, an elongate transfer rail, a frictional drive element, and frictional drive pressure maintaining means, and wherein, the elongate drive rail is non-rigidly mounted to the elongate transfer rail, the elongate drive rail is adapted to be disposed intermediate the frictional drive element and frictional drive pressure maintaining means, the frictional drive element is motivated by a prime mover, the elongate transfer rail further incorporates closure element support means and at least one supporting guide follower, whereby, in use, the supporting guide follower(s) is/are adapted to be locateable within the guide rail.

10. A closure element translation mechanism comprising an elongate drive rail, an elongate guide rail, closure element support means, a frictional drive element, and frictional drive pressure maintaining means, and wherein, the elongate drive rail is non-rigidly mounted to the closure element support means, the elongate drive rail is adapted to be disposed intermediate the frictional drive element and frictional drive pressure maintaining means, the frictional drive element is motivated by a prime mover and wherein the closure element support means incorporates at least one supporting guide follower, whereby, in use, said at least one supporting guide follower is adapted to be locateable within the guide rail.

11. A closure element translation mechanism as claimed in claim 10, wherein the non-rigid mounting of the drive rail to the closure element support means is adapted to provide a degree of lateral sliding therebetween.

12. A closure element translation mechanism as claimed in claim 10, wherein the prime-mover motivating the frictional drive element is a stepping motor.

13. A closure element translation mechanism as claimed in claim 10, wherein the guide rail is of non-linear configuration.

14. A sliding door actuator comprising an elongate drive rail, an elongate guide rail, door support means, a frictional drive element, and frictional drive pressure maintaining means, and wherein the elongate drive rail is non-rigidly mounted to the door support means, the elongate drive rail is adapted to be disposed intermediate the frictional drive element and frictional drive pressure maintaining means, the frictional drive element is motivated by a prime mover and wherein the door support means incorporates at least one supporting guide follower, whereby, in use, said at lease one supporting guide follower is adapted to be locateable within the guide rail.

15. A sliding door actuator as claimed in claim 14, wherein the guide rail is of a non-linear configuration.

16. A sliding door actuator as claimed in claim 14, wherein the non-rigid mounting of the drive rail to the door support means is adapted to provide a degree of lateral sliding there-between.

17. A sliding door actuator as claimed in claim 14, wherein the prime-mover motivating the frictional drive element is a stepping motor.

* * * * *